United States Patent Office 2,864,767
Patented Dec. 16, 1958

2,864,767

UTILIZATION OF SULPHURIC ACID IN THE PREPARATION OF FLUID LUBRICANTS

Arnold J. Morway, Clark, N. J., assignor to Esso Research and Engineering Company, a corporation of Delaware No Drawing. Application November 30, 1955
Serial No. 550,205

9 Claims. (Cl. 252—40.7)

This invention relates to new and improved lubricating compositions, and more particularly to fluid and semi-fluid lubricants having outstanding fluidity and extreme pressure characteristics.

In brief, the invention pertains to the direct utilization of sulphuric acid or other strong inorganic acids in combination with low molecular weight carboxylic acids having from about 1 to 3 carbon atoms per molecule and intermediate molecular weight carboxylic acids having from about 7 to 10 carbon atoms per molecule to prepare lubricating compositions. The lubricants of the invention are particularly useful for boundary lubrication services where thixotropic properties are either undesirable or not required. Such lubricating services include, for example, the lubrication of automotive transmissions and marine diesel upper cylinders.

The use of combinations of low and intermediate molecular weight carboxylic acids to prepare fluid and semi-fluid lubricants has already been suggested. When the mol ratio of the low to the intermediate molecular weight carboxylic acids was about 5:1, semi-fluid lubricants having definite thixotropic properties were obtained. Increasing the mol ratio from about 5:1 to 12:1 resulted in fluid lubricants having somewhat improved fluidity and extreme pressure characteristics. It has now been found that by employing sulphuric acid in conjunction with these organic carboxylic acids, even greater fluidity and less thixotropy can be achieved.

It is not exactly known what reactions the sulphuric acid or other mineral acids enter into during the preparation of the lubricants of this invention. In some instances it would appear that the concentrated mineral acid has reacted with some of the organic material present. For the present purposes, however, it is sufficient to note that the mineral acid contributes in some manner to the production of lubricants having the properties previously discussed.

The sulphuric acid may be utilized in concentrations ranging from about 50 to 100%, concentrations of about 97% and 98% being preferred. The amounts employed will vary from about 1 to 5 wt. percent, preferably about 2 to 4 wt. percent, based on the total lubricating composition. Instead of straight sulphuric acid, acid sludges containing high percentages of sulphuric acid may also be employed. One such sulphuric acid-containing sludge is obtained from the manufacture of white oil. In general, this sludge is obtained by treating a phenol extracted Mid-Continent distillate, having a viscosity of about 40 at 210° F., with fuming sulphuric acid, about 104 equivalent percent. For the purposes of the present invention the acid sludge so obtained will be referred to as acid sludge A. Though the exact composition of acid sludge A is somewhat difficult to determine, it will have the following approximate formulation:

|   | Percent |
|---|---|
| Sulphuric acid | 75.9 |
| Water | 23.4 |
| Mineral lubricating oil | 2.5 |

Small amounts of sulfonic acids and carbon.

Suitable acid sludges so obtained will ordinarily contain more than about 50% of free sulphuric acid. About 2 to 5 wt. percent of the acid sludges, based on the total lubricating composition, can be employed for the purposes of this invention.

As previously noted, other mineral acids such as hydrochloric acid, phosphoric acid and nitric acid may also be used in preparing the lubricant compositions within the scope of this invention. When these acids are utilized, their concentrations and weight percentages will vary within the ranges described with respect to the sulphuric acid.

Suitable low molecular weight carboxylic acids are the saturated and unsaturated aliphatic carboxylic acids having from about 1 to 3 carbon atoms per molecule. Examples of such acids include formic acid, acetic acid, propionic acid, etc. Acetic acid is preferred and may be either glacial acetic acid or an aqueous solution thereof, the concentration of the acetic acid in the aqueous solutions varying from about 60 to 99.9 wt. percent. Substituted acetic acids having two carbon atoms per molecule such as chloro-acetic acid, glycolic acid, thioglycolic acid, glycine, etc. may also be used to modify the structure of lubricating compositions made in accordance with this invention. The amount of low molecular weight carboxylic acid employed will be within the range of about 4 to 20 wt. percent, preferably about 5 to 15 wt. percent, based on the total lubricating composition.

The intermediate molecular weight acids are those aliphatic monocarboxylic acids containing from about 7 to 10 carbon atoms, preferably about 8 to 9 carbon atoms. Either saturated or unsaturated fatty acids may be utilized, though the saturated fatty acids are preferred. Straight chain or substantially straight chain acids are also preferred. The average saponification value of the single or mixed intermediate molecular weight acids should be about 310 to 440, preferably about 325 to 420. Some of the intermediate molecular weight monocarboxylic acids coming within the above prescriptions are exemplified by:

5-methyl-2-hexanoic
Heptanoic (enanthic)
Octanoic (caprylic)
2-ethyl hexanoic
$C_8$ Oxo acids
Nonanoic (pelargonic)
Decanoic (capric)
$C_{10}$ Oxo acids Commercial mixtures of these intermediate molecular weight carboxylic acids having an average saponification value of from about 310 to 440 can also be employed.

In general, the amount of the intermediate molecular weight carboxylic acid employed will vary from about 0.5 to 5 wt. percent, preferably from about 1 to 4 wt. percent based on the total lubricating composition.

The Oxo acids useful for the purposes of the present invention, e. g. the saturated branched chain $C_8$ and $C_{10}$ Oxo acids, can be prepared by means of the well known Oxo synthesis. This process involves the oxonation or carbonylation of olefins with carbon monoxide and hydrogen at temperatures of about 300° to 400° F. and pressures of about 2500 to 4000 p. s. i. g. in the presence of a group VIII metal catalyst, preferably cobalt. In U. S. Patent No. 2,632,021 the Oxo process and the nature of the reaction products, e. g. the $C_8$ Oxo products, are disclosed in detail. The preparation of Oxo acids from the Oxo reaction products is described in U. S. Patent No. 2,537,577 and U. S. Patent No. 2,553,364. Neither the preparation of the Oxo reaction products nor the preparation of Oxo acids therefrom are considered to be directly related to the essence of the present invention. The $C_8$ and $C_{10}$ Oxo acids may be derived respectively from $C_7$ and $C_9$ olefins obtained by polymerizing propylene alone or with some butylene.

In general, the mol ratio of low molecular weight carboxylic acid to the intermediate molecular weight carboxylic acid will be within the range of about 3 to 20, preferably about 10 to 15. The mol ratio of the total low molecular weight acids, i. e. the sulphuric acid and the low molecular weight carboxylic acid, to the intermediate molecular weight acid will be about 4 to 25, preferably about 11 to 18.

The metals suitable for neutralizing the above acids are the alkaline earth metals: calcium, barium, magnesium and strontium. The above metals are generally employed in the form of hydroxides or carbonates, and the process of this invention will utilize from about 5 to 15 wt. percent, based on the total lubricating composition, of the metal hydroxide or carbonate. Calcium is prefered, though mixtures of the above metals may also be employed, if desired.

The lubricating oils employed as the menstrua of the lubricant compositions of this invention may be either conventional grease-making mineral oils or synthetic lubricating oils. In general, the mineral and synthetic lubricating oils should have a viscosity within the range of about 50 to 2000 S. U. S. at 100° F. and about 30 to 220 S. U. S. at 210° F., an ASTM pour point of about +20 to —75° F., a flash point of about 350° to 650° F., and a viscosity index of about 0 to 60, although lubricating oils having a viscosity index of 100 or higher can also be employed.

The synthetic lubricating oils include esters of monobasic acids (e. g. an ester of $C_8$ Oxo alcohol with $C_8$ Oxo acid, an ester of $C_{13}$ Oxo alocohol with octanoic acid, etc.), esters of dibasic acids (e. g. di-2-ethyl hexyl sebacate, di-nonyl adipate, etc.), esters of glycols (e. g. $C_{13}$ Oxo acid diester of tetraethylene glycol, etc.), complex esters (e. g. the complex ester formed by reacting one mole of tetraethylene glycol with two moles of sebacic acid and two moles of 2-ethyl hexanol, a complex ester formed by reacting one mole of azelaic acid, one mole of tetraethylene glycol, one mole of $C_8$ Oxo alcohol and one mole of $C_8$ Oxo acid, etc.), esters of phosphoric acid (e. g. the ester formed by contacting three moles of the mono-methyl ether of ethylene glycol with one mole of phosphorus oxychloride, etc.), halocarbon oils (e. g. the polymer of chlorotrifluoroethylene containing twelve recurring units of chlorotrifluoroethylene), alkyl silicates (e. g. methyl polysiloxanes, ethyl polysiloxanes, methylphenyl polysiloxanes, etc.), sulfite esters (e. g. ester formed by reacting one mole of sulfur oxychloride with two moles of the methyl ether of ethylene glycol, etc.), carbonates (e. g. the carbonate formed by reacting $C_8$ Oxo alcohol with ethyl carbonate to form a half ester and reacting this half ester with tetraethylene glycol), mercaptals (e. g. the mercaptal formed by reacting 2-ethyl hexyl mercaptan with formaldehyde), formals (e. g. the formal formed by reacting $C_{13}$ Oxo alcohol with formaldehyde), polyglycol type synthetic oils (e. g. the compounds formed by condensing butyl alcohol with fourteen units of propylene oxide, etc.), or mixtures of the above in any proportions.

The lubricating compositions of the invention will contain from about 50 to 95 wt. percent, preferably about 70 to 90 wt. percent, of the mineral and/or synthetic lubricating oil and about 5 to 50 wt. percent, preferably about 10 to 30 wt. percent, of the reaction products of blends or mixtures of the above acids with the metal base.

Conventional lubricating oil additives may also be employed in the lubricants of the present invention. Such additives, for example include: oxidation inhibitors such as phenyl alpha naphthylamine, corrosion inhibitors such as sorbitan monooleate, tackiness agents such as polyisobutene, and the like.

In general, the lubricating compositions of this invention are prepared by charging all or a dispersing portion of the lubricating oil base and the hydrated lime to a steam heated grease kettle to obtain a smooth slurry with stirring. A blend of the sulphuric acid, low molecular weight carboxylic acids and intermediate molecular weight carboxylic acids is then added, and the stirring is continued for about 1 to 2 hours until the temperature subsides. External heating is then initiated, and the grease is heated to about 300° to 340° F. for about 2 to 8 hours until dehydration is completed. Conventional lubricating oil additives such as phenyl alpha naphthylamine may then be added, the resulting fluid lubricant cooled to about 120° to 180° F., and homogenized at about 3,000 to 10,000 p. s. i. g. at rates of shear in order of 50,000 to 500,000 reciprocal seconds. Any suitable homogenizing equipment such as a Morehouse mill, Gaulin homogenizer, etc. may be employed.

The invention will be more fully understood by reference to the following specific example illustrating various modifications of the invention.

EXAMPLE

A number of mineral oil base lubricant compositions having the formulations and properties listed in the table below were prepared as follows:

Lubricant A

The mineral lubricating oil and the lime were charged to a steam heated kettle to form a smooth slurry with stirring. A blend of the acetic acid, the commercial caprylic acid and the sulphuric acid was then added to the slurry. The stirring was continued for about ½ hour until the temperature subsided from about 165° F. A smooth grease-like structure formed, and it was heated to a temperature of about 320° F. (110 p. s. i. g. steam pressure) for about two hours until completely dehydrated. The phenyl alpha naphthylamine was then added, and the grease rapidly cooled to 150° F. by passing cold water through the jacket. The grease was finished by being Gaulin homogenized at 7000 p. s. i. g.

The above product is referred to as the base, and in order to obtain the fluid lubricant of the invention 50 wt. percent of this base was blended with about 50 wt. percent of additional mineral lubricating oil.

Lubricant B

The base material and the finished lubricant was prepared by the method described above with respect to lubricant A, with the exception that acid sludge A was employed in place of the sulphuric acid.

Lubricants C and D

Method of preparation similar to that described with respect to lubricant A, except that sulphuric acid or the sulphuric acid-containing sludge were not employed.

Lubricants E and F

Method of preparation is similar to that described with respect to lubricant A, except that no acetic acid was employed in lubricant E and nitric acid was employed in place of sulphuric acid in the base of lubricant F. The finished lubricant F was prepared by diluting 40% of the base with 60% additional mineral lubricating oil.

TABLE

| Formulation | A | | B | | C | D |
|---|---|---|---|---|---|---|
| | Base | Finished Lubricant | Base | Finished Lubricant | | |
| Glacial Acetic Acid | 11.0 | 5.50 | 11.0 | 5.50 | 4.50 | 5.63. |
| Commercial Capric Acid [1] | 2.5 | 1.25 | 2.5 | 1.25 | 2.25 | 1.34. |
| Sulphuric Acid (97%) | 2.0 | 1.00 | | | | |
| Acid Sludge A | | | 2.5 | 1.25 | | |
| Hydrated Lime | 10.0 | 5.00 | 10.0 | 5.0 | 3.70 | 4.13. |
| Phenyl alpha naphthylamine | 0.5 | 0.25 | 0.5 | 0.25 | 0.19 | 0.18. |
| Mineral Lubricating Oil, 80 SUS @ 210° F | 74.0 | 87.00 | 73.5 | 86.75 | 89.36 | 88.72. |
| Mol ratio of acetic acid to commercial caprylic acid | 12:1 | 12:1 | 12:1 | 12:1 | 5:1 | 21:1. |
| Mol ratio of low mol. wt. acids to commercial caprylic acid | 13.6:1 | 13.6:1 | 13.5:1 | 13.5:1 | | |
| Properties: | | | | | | |
| Appearance | Smooth semi-fluid. | Fluid | Semi-fluid | Fluid | | |
| Phase changes up to 400° F | None | | None | None | | |
| Penetration, 77° F. mm./10 | 420 | | Too soft | | | |
| Stability (Freedom from settling) | | Excellent | | Excellent | | |
| S. I. L. Mobilometer Consistency, 77° F | | 932 | | 934 | 725 | 862. |
| E. P. Properties: | | | | | | |
| Timken Test, load 40, 45 lbs | | Pass, narrow scar. | | Pass | 35 Fail | 40 Pass. |
| Timken Test, load 50 lbs | | | | Fail | | 45 Fail. |
| Almen Test Shock Loading (Wgts. Carried) | | 15 | | 15 | | |
| SAE Test 14.6/1 Ratio, 1,000 R. P. M | | 255 | | 110 | | |
| 4 Ball Wear Test (1,800 R. P. M.—10 Kg.—75° C.—1 hr.) | | 0.24 | | 0.24 | 0.33 | 0.27. |

| Formulation (Wt. Percent) | E | F | |
|---|---|---|---|
| | | Base | Finished Lubricant |
| Glacial Acetic Acid | | 12.0 | 4.8. |
| Sulphuric Acid | 6.0 | | |
| Nitric Acid (70% conc.) | | 3.0 | 1.2. |
| Commercial Capric Acid | 3.0 | 2.0 | 0.8. |
| Hydrated Lime | 6.0 | 10.5 | 4.2. |
| Phenyl Alpha Naphthylamine | 0.5 | 0.5 | 0.2. |
| Mineral Lubricating Oil, 80 SUS @ 210° F | 84.5 | 72.0 | 88.8. |
| Properties: | | | |
| Appearance | Soap did not disperse [2] | Excellent semi-fluid | Excellent, nonthixotropic fluid. |
| Free Alkalinity (Percent NaOH) | | 0.87 | |
| S. I. L. Mobilometer Consistency, 77° F | | | 894. |
| 4 Ball Wear Test, Spot Diameter, mm., (1,800 R. P. M.—10 Kg. load—1 hr.—75° C.) | | | 0.25. |

[1] Composition: 24.5% caprylic acid; 57.8% capric acid; and 17.6% lauric acid. Sap. No. 327 and Mol. Wt. 172.
[2] Soap also failed to disperse satisfactorily even after being homogenized twice.

The above data show that the fluid lubricants of this invention, as represented by finished lubricants A and B, have greater fluidity, less thixotropy and a higher load carrying ability than lubricants prepared without sulphuric acid or acid sludge A. The mobilometer data set forth above is determined by measuring the weight and time required to push a perforated cone through the lubricant sample. The S. I. L. consistency number is calculated from the following formula $$\text{S. I. L. Consistency No.} = \sqrt[4]{\frac{5000}{L \times T}}$$

where L is the weight in grams of the plunger assembly, and T is the time in seconds. The S. I. L. mobilometer consistency (77° F.) of mineral lubricating oil having a viscosity of 80 SUS at 210° F., the base oil employed in the example, was 997. Since fluidity is directly proportional to the mobilometer consistency readings, the inventive lubricating compositions have been shown to be more desirable in this respect than lubricants C and D.

As noted above, the base lubricants can be blended with additional lubricating oil to obtain compositions encompassed by the invention. In general, about 25 to 75 wt. percent of the base can be blended with about 75 to 25 wt. percent of additional lubricating oil. The blending may be carried out either under hot or cold temperature conditions. The lubricant composition may be finished by homogenization in any standard homogenizing equipment at 5,000 to 10,000 p. s. i. g.

It will be further understood that the present invention is not necessarily limited to the specific materials and conditions of the foregoing examples, since they may be varied within the limits indicated in the general portions of the specification.

What is claimed is:

1. A fluid lubricating composition comprising a major proportion of lubricating oil and 5 to 50 wt. percent of an alkaline earth metal base neutralized blend of a strong inorganic acid, a low molecular weight carboxylic acid having 1 to 3 carbon atoms per molecule and an intermediate molecular weight carboxylic acid having 7 to 10 carbon atoms per molecule, wherein the mol ratio of said low to intermediate molecular weight carboxylic acid is about 3:1 to 20:1 and the mol ratio of the total inorganic acid and low molecular weight acid to said intermediate molecular weight acid is about 4:1 to 25:1.

2. The composition of claim 1 wherein said lubricating oil is a mineral lubricating oil.

3. The composition of claim 1 wherein said base is calcium hydroxide.

4. The composition of claim 1 wherein said inorganic acid is sulphuric acid.

5. A fluid lubricating composition consisting essentially of a major proportion of lubricating oil and as the sole salt component 5 to 50 wt. percent of an alkaline earth metal base neutralized blend of sulphuric acid, low molecular weight carboxylic acid having from about 1 to 3 carbon atoms per molecule and intermediate molecular weight carboxylic acid having from about 7 to 10 carbon atoms per molecule, wherein the mole ratio of low to intermediate molecular weight corboxylic acids is about 10:1 to 20:1, and wherein the mol ratio of the total sulfuric acid and low molecular weight carboxylic acid to the intermediate molecular weight carboxylic acid is about 4:1 to 25:1.

6. The composition of claim 5 wherein said low molecular weight acid is acetic acid.

7. A method of preparing a fluid lubricating composition which comprises dispersing an alkaline earth metal base in a lubricating oil, adding to said dispersion a mixture of a strong inorganic acid, a low molecular weight carboxylic acid having about 1 to 3 carbon atoms per molecule and an intermediate molecular weight carboxlyic acid having from about 7 to 10 carbon atoms per molecule, wherein the molar ratio of said low molecular weight acid to said intermediate molecular weight acid is about 3:1 to 20:1 and wherein the molar ratio of the total of said inorganic acid and said low molecular weight acid to said intermediate molecular weight acid is about 4:1 to 25:1, heating the resulting mixture to a temperature of about 300° to 340° F. and then cooling to obtain said lubricating composition.

8. The method of claim 7 wherein said alkaline earth metal base is calcium hydroxide.

9. The method of claim 7 wherein said lubricating oil is a mineral lubricating oil.

References Cited in the file of this patent

UNITED STATES PATENTS

| | | |
|---|---|---|
| 2,384,551 | Jehle | Sept. 11, 1945 |
| 2,417,430 | McLennan | Mar. 18, 1947 |